United States Patent
Zhang et al.

(10) Patent No.: US 11,982,999 B2
(45) Date of Patent: May 14, 2024

(54) DEFECT DETECTION TASK PROCESSING METHOD, DEVICE, APPARATUS AND STORAGE MEDIUM

(71) Applicants: Beijing Zhongxiangying Technology Co., Ltd., Beijing (CN); BOE TECHNOLOGY GROUP CO., LTD., Beijing (CN)

(72) Inventors: Meijuan Zhang, Beijing (CN); Yaoping Wang, Beijing (CN); Zhaoyue Li, Beijing (CN); Yuanyuan Lu, Beijing (CN); Wangqiang He, Beijing (CN); Dong Chai, Beijing (CN); Hong Wang, Beijing (CN)

(73) Assignees: Beijing Zhongxiangying Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 224 days.

(21) Appl. No.: 17/429,013

(22) PCT Filed: Oct. 30, 2020

(86) PCT No.: PCT/CN2020/125439
§ 371 (c)(1),
(2) Date: Aug. 6, 2021

(87) PCT Pub. No.: WO2022/088082
PCT Pub. Date: May 5, 2022

(65) Prior Publication Data
US 2023/0030296 A1    Feb. 2, 2023

(51) Int. Cl.
G05B 23/02    (2006.01)
G05B 13/02    (2006.01)

(52) U.S. Cl.
CPC ....... *G05B 23/0224* (2013.01); *G05B 13/028* (2013.01); *G05B 2223/02* (2018.08)

(58) Field of Classification Search
None
See application file for complete search history.

(56) References Cited

U.S. PATENT DOCUMENTS 5,481,707 A * 1/1996 Murphy, Jr. .......... G06F 13/124
                                                                        714/48
10,764,125 B2   9/2020 Zhang et al.
(Continued)

FOREIGN PATENT DOCUMENTS

CN    103458527 A    12/2013
CN    103458527 B    2/2017
(Continued)

OTHER PUBLICATIONS

Written Opinion for International Application No. PCT/CN2020/125439 dated Jul. 30, 2021.
(Continued)

*Primary Examiner* — Bernard G Lindsay
(74) *Attorney, Agent, or Firm* — Perilla Knox & Hildebrand LLP; Kenneth A. Knox

(57) ABSTRACT

The present disclosure relates to a task processing method and device based on defect detection, a computer readable storage medium, and a task processing apparatus. The method includes receiving a detection task; determining a task type of the detection task; storing the detection task in a task queue if the task type is a target task type; and executing the detection task in a preset order and generating a feedback signal when a processor is idle. The detection task of the target task type includes an inference task and a training task. Executing the training task includes modifying configuration information according to a preset rule based on product information in the detection task; acquiring
(Continued)

training data and an initial model according to the product information; and using the training data to train the initial model according to the configuration information to obtain a target model and store it in memory.

18 Claims, 9 Drawing Sheets

(56) References Cited

U.S. PATENT DOCUMENTS

| | | | |
|---|---|---|---|
| 2008/0297242 A1* | 12/2008 | Vig | G01R 31/2829 327/576 |
| 2012/0027288 A1 | 2/2012 | Yuan et al. | |
| 2015/0324234 A1* | 11/2015 | Chang | G06F 9/5033 718/104 |
| 2016/0147883 A1 | 5/2016 | Mukundan et al. | |
| 2018/0157933 A1* | 6/2018 | Brauer | G06F 18/24143 |
| 2018/0300864 A1 | 10/2018 | Baba et al. | |
| 2018/0331897 A1 | 11/2018 | Zhang et al. | |
| 2019/0093187 A1* | 3/2019 | Lee | G06N 3/08 |
| 2019/0155633 A1* | 5/2019 | Faulhaber, Jr. | G06N 5/04 |
| 2019/0204815 A1* | 7/2019 | Ota | G05B 19/41875 |
| 2020/0226742 A1 | 7/2020 | Sawlani et al. | |
| 2020/0264922 A1* | 8/2020 | Kamiya | G06F 9/4881 |
| 2021/0157716 A1 | 5/2021 | Allen et al. | |
| 2021/0232121 A1* | 7/2021 | Pramanick | G06F 40/30 |
| 2022/0043836 A1* | 2/2022 | Upadhyay | G06N 5/04 |
| 2022/0245402 A1 | 8/2022 | Tae et al. | |

FOREIGN PATENT DOCUMENTS

| | | |
|---|---|---|
| CN | 107274471 A | 10/2017 |
| CN | 108268892 A | 7/2018 |
| CN | 109800137 A | 5/2019 |
| CN | 110376220 A | 10/2019 |
| CN | 110554047 A | 12/2019 |
| CN | 110990132 A | 4/2020 |
| CN | 111024708 A | 4/2020 |
| CN | 107274471 B | 10/2020 |
| CN | 111738156 A | 10/2020 |
| EP | 3399426 A1 | 11/2018 |

OTHER PUBLICATIONS

International Search Report for International Application No. PCT/CN2019/127040 dated Sep. 24, 2020.
Written Opinion for International Application No. PCT/CN2019/127040 dated Sep. 24, 2020.
"Integrated Industrial Visual Inspection Scheme in Combination with Training and Inference," https://wpig-iotsolutionaggregator.wpgholdings.com/eng/solution/detail/EIS_Setup (Oct. 30, 2019).
Karthikeyan et al., "Design and implementation of CfoTS networks for industrial fault detection and correction mechanism," The Journal of Supercomputing (Sep. 13, 2019).
Non-Final Office Action for U.S. Appl. No. 17/044,160 dated Oct. 26, 2023.

* cited by examiner

DEFECT DETECTION TASK PROCESSING METHOD, DEVICE, APPARATUS AND STORAGE MEDIUM

CROSS-REFERENCE TO RELATED APPLICATION

This application is a national phase application under 35 U.S.C. § 371 of International Application No. PCT/CN2020/125439 filed Oct. 30, 2020, the contents of which being incorporated by reference in their entirety herein.

TECHNICAL FIELD

The present disclosure relates to the field of defect detection technologies and, in particular, to a task processing method based on defect detection, device and apparatus, and a computer non-volatile computer readable storage medium.

BACKEND

In the related art, defect detection of a display screen is performed manually. Thus, detection speed is slow and it is easy for unnecessary losses to be caused due to human error.

It should be noted that the information disclosed in the Backend section above is only for enhancing the understanding of the backend of the present disclosure, and thus may include information that does not constitute prior art known to those of ordinary skill in the art.

SUMMARY

According to a first aspect of the present disclosure, there is provided a task processing method based on defect detection, including:
  receiving a detection task, and determining a task type of the detection task;
  storing the detection task in a task queue if the task type is a target task type;
  executing the detection task in a preset order and generating a feedback signal when a processor is idle;
  the detection task of the target task type includes an inference task and a training task; executing the training task includes:
  modifying configuration information according to a preset rule, based on product information in the detection task;
  acquiring training data and an initial model according to the product information;
  using the training data to train the initial model according to the configuration information to obtain a target model and store it.

In an exemplary embodiment of the present disclosure, the task type includes the target task type and a reference task type;
  if the task type is the reference task type, the detection task is directly executed by the processor.

In an exemplary embodiment of the present disclosure, the executing the detection task in the preset order includes:
  executing the detection task according to an order of storage in the task queue.

In an exemplary embodiment of the present disclosure, the modifying the configuration information according to the preset rule, based on the product information in the detection task includes:
  extracting a product information field in the detection task to obtain the product information; and
  setting a size of a training image, a number of training times, a number of test times, a defect threshold, and a learning rate decay strategy according to the preset rule, based on the product information.

In an exemplary embodiment of the present disclosure, the training task includes a training data acquiring address and model data information; the acquiring the training data and the initial model according to the product information includes:
  downloading the training data according to the training data acquiring address;
  acquiring the model data information according to a model data information field; and
  acquiring the initial model according to the model data information.

In an exemplary embodiment of the present disclosure, the training data includes a label file and an image file, and before the using the training data to train the initial model according to the configuration information to obtain the target model and store it, the method further includes:
  pre-processing the training data;
  the pre-processing the training data includes:
  deleting an abnormal image in the image file;
  deleting an image file that does not need to match the label file;
  matching the image file with the label file; and
  dividing the training data into a training set, a validation set, and a test set according to a preset ratio.

In an exemplary embodiment of the present disclosure, the using the training data to train the initial model according to the configuration information to obtain the target model and store it includes:
  training the initial model according to the training set, the validation set, and the number of training times;
  using the test set and the number of test times to complete a test on the trained initial model to obtain the target model and store it.

In an exemplary embodiment of the present disclosure, the detection task includes a task type label, and the determining the task type of the detection task includes:
  identifying the task type label in the detection task to determine the task type of the detection task.

In an exemplary embodiment of the present disclosure, the executing the training task further includes:
  uploading the target model and a training result to a preset address; and
  the training result includes an accuracy rate, a recall rate and an F1 score of the target model.

In an exemplary embodiment of the present disclosure, executing the inference task includes:
  acquiring the target model and image information of a product according to the product information; and
  inputting the image information to the target model to obtain a defect location and a defect type of the product.

In an exemplary embodiment of the present disclosure, the inference task includes an image information acquiring address, and the acquiring the image information of the product according to the product information includes:
  downloading the image information according to the image information acquiring address.

In an exemplary embodiment of the present disclosure, the acquiring the target model according to the product information includes:
  detecting whether there is a target model corresponding to the product information in a local repository;

if there is the target model corresponding to the product information in the local repository, loading the target model in the local repository; and if there is no target model corresponding to the product information in the local repository, downloading the target model corresponding to the product information according to the product information by the local repository.

In an exemplary embodiment of the present disclosure, the local repository includes a preset number of target models, and when a number of target models in the local repository is greater than the preset number, the local repository is updated according to a time sequence in which the target model is used, so that the number of target models in the local repository remains at the preset number.

In an exemplary embodiment of the present disclosure, the executing the inference task further includes:

generating the feedback signal according to the defect location and the defect type of the product.

According to an aspect of the present disclosure, there is provided a task processing device based on defect detection, including:

a communication node, configured to receive detection task, and identify a task type of the detection task;

a task management node configured to store the detection task in a task queue if the task type is a target task type; and execute the detection task in a preset order and generate a feedback signal when a processor is idle.

In an exemplary embodiment of the present disclosure, the device further includes:

a task agent node configured to receive the feedback signal and send the feedback signal through the communication module.

According to an aspect of the present disclosure, there is provided a task processing apparatus based on defect detection, including:

a processor; and a memory, configured to store one or more programs which, when executed by one or more processors, cause the one or more processors to implement the task processing method based on defect detection as described in any of the above.

In an exemplary embodiment of the present disclosure, the task type includes a target task type and a reference task type; the processor includes:

a first processor, including at least one graphics processor configured to execute the inference task and the training task;

a second processor, including at least one graphics processor configured to execute a detection task of the reference task type.

According to an aspect of the present disclosure, there is provided anon-volatile computer-readable storage medium on which a computer program is stored, and the program, when executed by a processor, implements the task processing method based on defect detection as described in any of the above.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Figure 1:
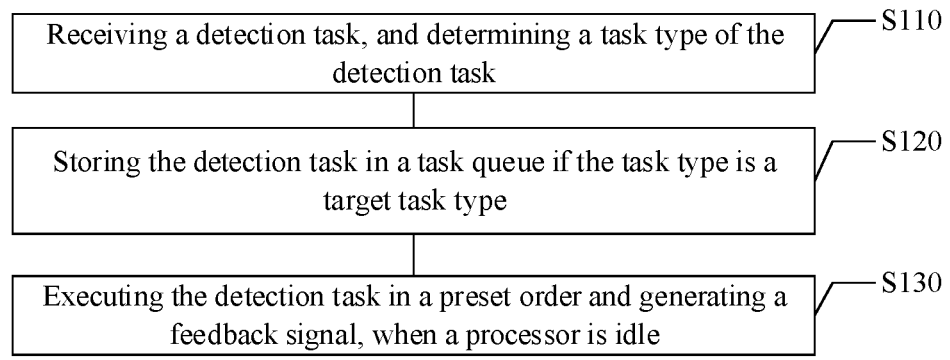
FIG. 1 schematically shows a flowchart of a task processing method based on defect detection in an exemplary embodiment of the present disclosure.

Exemplary embodiments will now be described more fully with reference to the accompanying drawings. However, the embodiments may be implemented in a variety of forms and should not be construed as being limited to the examples set forth herein; rather, these embodiments are provided so that The present disclosure will be more complete so as to convey the idea of the exemplary embodiments to those skilled in this art. The described features, structures, or characteristics in one or more embodiments may be combined in any suitable manner.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

In an exemplary embodiment, there is first provided a task processing method based on defect detection, which may be applied to defect detection of a display screen. Referring to FIG. 1, the task processing method based on defect detection may include the following steps:

in S110, a detection task is received, and a task type of the detection task is determined;

in S120, if the task type is a target task type, the detection task is stored in a task queue; and in S130, when a processor is idle, the detection task is executed in a preset order and a feedback signal is generated;

the detection task of the target task type includes an inference task and a training task; executing the training task includes:

modifying configuration information according to a preset rule, based on product information in the detection task;

acquiring training data and an initial model according to the product information;

using the training data to train the initial model according to the configuration information to obtain a target model and store it.

Compared to the related art, in the task processing method based on defect detection provided in the exemplary embodiment, the detection task is received, and the detection task of the target task type is stored in the task queue. The processor processes the detection task when being idle to complete the training task and the inference task to achieve product detection. A computer training model is used for inference without the need to manually perform product detection, thereby speeding up the detection efficiency, preventing loss due to human error, and improving detection accuracy.

Hereinafter, each step of the task processing method based on defect detection in the exemplary embodiment will be described in more detail with reference to the accompanying drawings and embodiments.

In the step S110, the detection task is received, and the task type of the detection task is determined.

Figure 2:
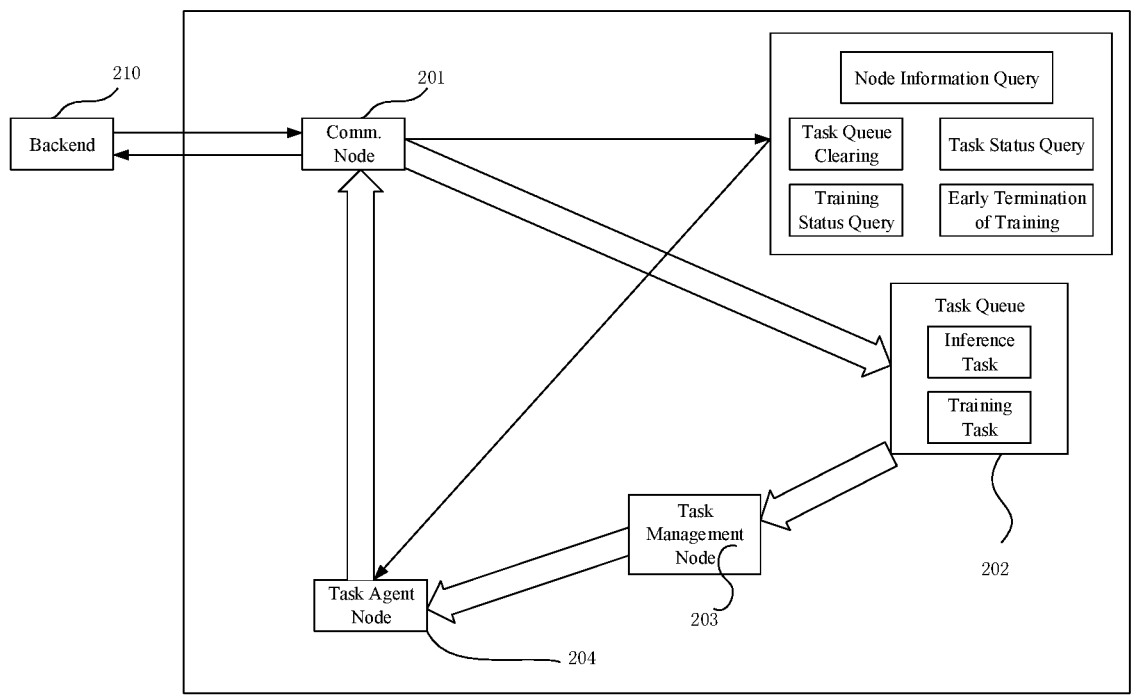
FIG. 2 schematically shows a schematic diagram of a server in an exemplary embodiment of the present disclosure.

In an exemplary embodiment of the present disclosure, referring to FIG. 2, a server receives the detection task, and the detection task may be issued by a backend 210. The task type of the detection task may include the target task type and the reference task type, and the detection task of the target task type may include the training task, the inference task, etc. A detection task of the reference task type may include a training status query task, early termination of a training task, a node information query task (querying a unique identification number and type of a current graphics processing unit (GPU) node), and a clear task for a task queue 202 and a task status query task. In the exemplary embodiment, the server may be a GPU server.

In the exemplary embodiment, the detection task includes a task type label, and the server may determine the task type of the detection task according to the task type label. A task format of the detection task is composed of a task header and a task body. The task header may be used for distinguishing the task type. In the exemplary embodiment, there are three types of task headers, namely transact (a transact request task), reply (a transact reply task), and Ack (an acknowledgement task). A task body of the Transact type may include a "type" key to indicate the type of the detection task.

In the exemplary embodiment, the server may establish a socket network connection with the backend 210 through the communication node 20. The backend 210 may send the detection task to the communication node 201 of the server through a transmission control protocol (TCP) protocol, and the server receives the detection task through the communication node 201, and determines the task type of the detection task through the task type label.

In the step S120, if the task type is the target task type, the detection task is stored in the task queue.

In an embodiment of the present disclosure, referring to FIG. 2, the number of various detection tasks received by the communication node 201 may be multiple. When the task type of the detection task is the target task type, the detection task in the target task type, such as the training task and the inference task, takes a long time to execute. Therefore, the detection task may be stored in the task queue 202.

In the exemplary embodiment, when the detection task is of the reference task type, since an execution time of the detection task of the reference task type is relatively short, it may be directly executed by the processor.

In the step S130, when the processor is idle, the detection task is executed in the preset order and the feedback signal is generated.

In the exemplary embodiment, the server may try to detect a state of the processor. After completing all tasks before the detection task, the processor executes the detection task in the preset order. The preset order may be an order of storage in the task queue, or it may be based on execution difficulty of tasks, which is not specifically limited in the exemplary embodiment.

Figure 3:
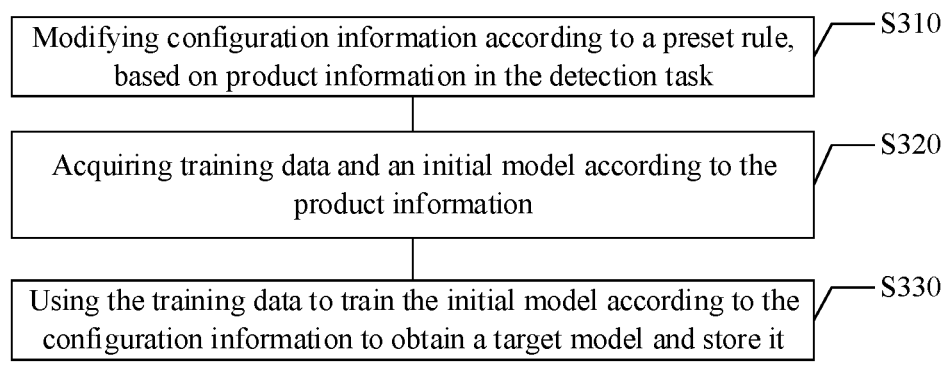
FIG. 3 schematically shows a flowchart of executing a training task in an exemplary embodiment of the present disclosure.

Specifically, referring to FIG. 3, the execution of the training task includes the following steps:

in step S310, the configuration information is modified according to the preset rule, based on the product information in the detection task;

in step S320, the training data and the initial model are acquired according to the product information; and in step S330, the training data is used to train the initial model according to the configuration information to obtain the target model and store it.

Figure 4:
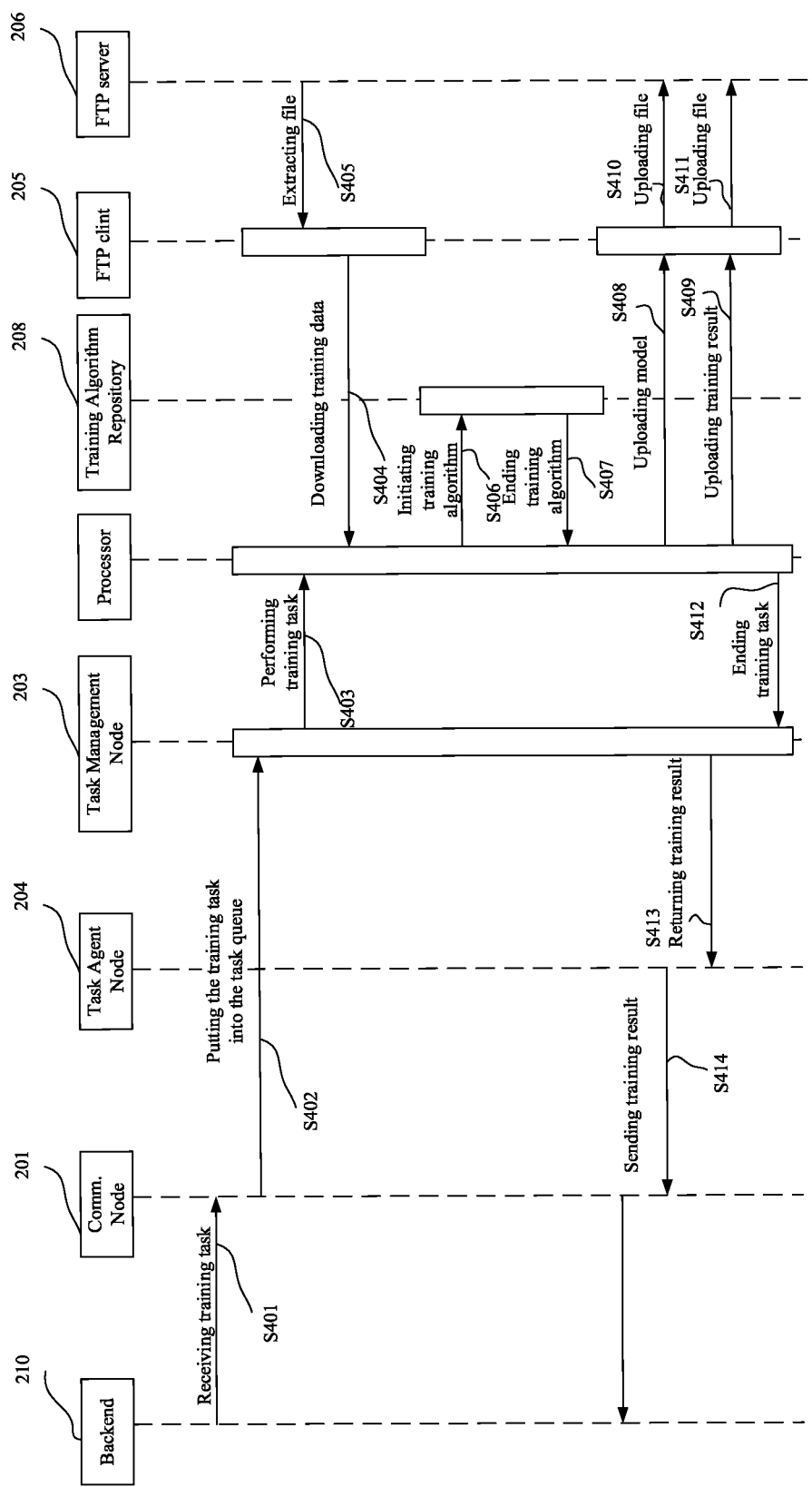
FIG. 4 schematically shows a schematic diagram of multi-stage interaction when a training task is executed in an exemplary embodiment of the present disclosure.

In the exemplary embodiment, referring to FIG. 4, the training task includes basic information required in training, such as a training data acquiring address, model data information, a training model uploading address, a training result uploading address, and related configuration of a file transfer protocol (FTP) server. A step S401 may be first executed in which the communication node 201 receives the training task from the backend 210. After receiving the training task, the communication node executes a step S402 in which the training task is put into the task queue 202, and a task management node 203 monitors the status of the processor. When the processor is idle, the training task will be extracted from the queue, and the training data and the initial model will be acquired in sequence to initiate the execution of a S403 to execute the training task.

In the exemplary embodiment, when the training data are acquired, a step S404 and a step S405 may be first executed. A large amount of training data may be downloaded from a remote FTP server 206 for training the initial model, and the model needs to be stored in a format set by an algorithm. Due to the large amount of training data, which may include hundreds of thousands of images, an FTP client may be used to load the training data with a multi-threaded FTP protocol 205. After the completion of acquiring the training data, a step S406 and a step S407 are executed to initiate a training algorithm, and the training algorithm may be called from a training algorithm repository 208, and the training data is used to train the initial model. When the preset number of training times is reached or an index requirement such as a training accuracy rate or a recall rate is reached, the training algorithm may be exited, and a step S412 is executed to complete the training task. Then steps S408, S409, S410, and S411 are performed to upload the trained model and details of the training result (such as the training accuracy rate, the recall rate, a loss value graph, a defect confusion matrix, etc.) to a specified directory in the FTP server, and the directory may be extracted from the training task.

Then, steps S413 and S414 are executed to package a final training result (the accuracy rate, the recall rate, an f1 score, and an md5 value of the model) into a TCP message according to a specified format, and the training task ends. Then, the processor may send the training result to the task agent node 204, and the task agent node 204 feeds back to the communication node 201, and the communication node 201 may finally send it to the backend 210, and the entire training process ends.

The above steps are described in detail below.

In the step S310, the configuration information is modified according to the preset rule, based on the product information in the detection task.

In the exemplary embodiment, according to actual service requirements, three types of images may be involved, which may be a final site image (SD_final site), an intermediate site image (mask site), and a TDI grayscale image. The SD_final final site image may be applied to a subcode model and a maincode model, the intermediate site image may be applied to the subcode model, and the TDI grayscale image may be applied to the subcode model.

In the exemplary embodiment, the final site image divides models according to a product type. Therefore, different products may be distinguished by different model names, and a naming format of a model used by the final site image may be product_name_date, the naming format of the maincode model is maincode_product name_date. The naming of the model name may also be customized according to requirements, which is not specifically limited in the exemplary embodiment.

In the exemplary embodiment, the intermediate site image divides models according to a site, and a naming rule for a model name of the subcode model used by the intermediate site image may be mask site name_date; the naming of the model name may also be customized according to requirements, which is not specifically limited in the exemplary embodiment.

In the exemplary embodiment, the TDI grayscale image divides models according to a conventional product and a vehicle-mounted product. The naming rule of the model used by the TDI grayscale image may be TDI_1/2_date. A model of the conventional product uses 1, and a model of the vehicle-mounted product uses 2. Since different model types may correspond to a different set of data processing (an image size, a matching mode between an image and a label, etc.). In addition, different products, or different products on the same site may correspond to different training parameters, so before the training algorithm is called, the server needs to clarify the training model and product, or site information.

In the exemplary embodiment, because an occurrence rate of the same defect code and a bottom form for the different products, or the different products on the same site are quite different, this will result in the amount of training data and difficulty of identification for the same defect code of the different products or the same product on different sites are different. Therefore, it is necessary to set different configuration information, such as training code lists, special defect code thresholds, image sizes, learning rate decay strategies, training times, and test times, for individual products or the same product on different sites.

In the exemplary embodiment, before the training is initiated, the user may set the above parameters on an interface according to a training task to be submitted, and then a training system may write the interface parameters into a configuration file of the server. After the training algorithm is initiated, the server may read corresponding configuration information according to the model type and the product information of the training task.

In the step S320, the training data and the initial model are acquired according to the product information.

In the step S330, the training data is used to train the initial model according to the configuration information to obtain the target model and store it.

In an exemplary embodiment of the present disclosure, the server receives the training task sent by the training system, and parses the task. In order to determine the model type and the product name/site name through the training task, the training task contains "modelPath" (a model field) and "trainType" fields (a product information field). Through the parsing of these two fields, the server may clarify the model type to be trained and the site name and the product name this time. For example, the task contains the "modelPath": /XXX/XXX/XXX/product_ak_20200422084814916" and "trainType": "subCodeTraining" fields. A processor of the server may parse these two fields to make it clear that the subcode model of the final site image of the product ack is to be trained this time In the exemplary embodiment, the training data is a core of the training model. The training data may be uploaded to a specified address manually. Before executing the training algorithm, the server may download the data from the specified address to a local file of the server in an FTP manner for subsequent data processing.

In the exemplary embodiment, before the training starts, the server may parse out the model data information in this training task, and the model data information may include the model type, the product name, the site name, and the corresponding configuration information. And the initial model is acquired according to the model data information. After the training data and the initial model are obtained, the server calls and initiates the training algorithm in the training algorithm repository. The training algorithm may include pre-processing of the training data, a training module, and a testing module, and the training module is used for training the initial model, and the test module is used for testing the trained initial model.

In the exemplary embodiment, when the training data is pre-processed, specifically, two folders of images and extensible markup language (XML) are first checked, respectively, and an abnormal code folder is deleted, such as other, unknown folders, etc., and a folder that images and XML do not match is also deleted; then, the XML folder corresponding to the code that does not require the label is deleted; the corresponding code folder under the XML folder is deleted according to a specific training data type. Finally, matching of the image file and the XML file is performed: all the image files in the image folder are matched with all label files in the label (XML) folder one by one. The image without the label file is deleted, or the label file without the image is deleted. The image file is an image file, and the XML file is a label file.

In the exemplary embodiment, the training data may be allocated according to a preset ratio to obtain a training set, a validation set, and a test set. The preset ratio may be 8:1:1, or may also be 6:2:2, which is not specifically limited in the exemplary embodiment.

Specifically, a TXT file may be generated, and the data set may be divided into the training set, the validation set, and the test set by 8:1:1, which are written into three files train.txt, val.txt, and test.txt, respectively. The train.txt, the val.txt and the test.txt correspond to the training set, the validation set and the test set, respectively. In addition, during the generation of the txt file, the file may be checked, problematic images are deleted without being written into the TXT file.

In the exemplary embodiment, after the completion of the preprocessing of the training data, the initial model is trained using the training data to obtain the target model. According to the "image scales" in the configuration information, the image of the training set may be modified to the corresponding size, and then sent to a constructed network to participate in the learning of initial model network parameters. The "learningRate_stepSize" in the configuration information sets the learning rate decay strategy. That is, after the initial model is trained to the specified number of rounds, the learning rate would be reduced to about ⅑ to ⅒ of the original one, so that the initial model may converge as soon as possible. "max_step" sets the number of training times, that is, when the model is trained the specified number of times, the training task ends.

In the exemplary embodiment, after the training of the initial model is completed, the server may use the test data set (the test.txt file) to perform a preset number of model tests on the trained initial model according to the "test_model_iter" in the configuration file, and obtain a model effect (the accuracy rate, the recall rate and the F1 score) of each test number. A user may select the best model as the target model for the inference task according to the accuracy rate and the recall rate of the tested model.

In the exemplary embodiment, after the training of the initial model is completed to obtain the target model, the server may store the target model to a specified address, that is, upload the target model to the FTP server 206 through the FTP client 205.

In the exemplary embodiment, when the model is tested, a confusion matrix of the model is generated. The server uploads the confusion matrix file corresponding to the target model to a path specified in the message, that is, uploads it to the FTP server 206 through the FTP client 205. Then the server sends feedback information to the backend 210 through the task agent node 204 and the communication node to complete the training task.

Figure 5:
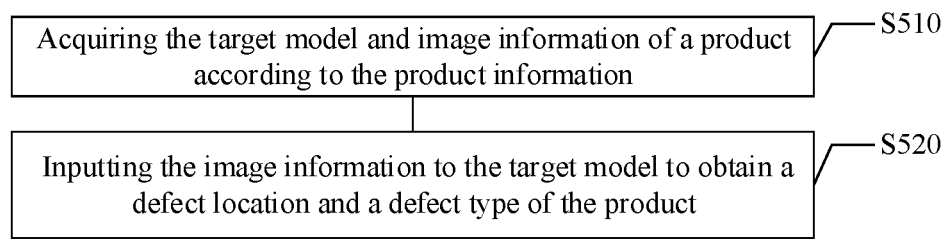
FIG. 5 schematically shows a flowchart of executing an inference task in an exemplary embodiment of the present disclosure.

In an exemplary embodiment of the present disclosure, referring to FIG. 5, the execution of the inference task may include the following steps:

in step S510, the target model and image information of a product are acquired according to the product information; and in step S520, the image information is input to the target model to obtain a defect location and a defect type of the product.

Figure 6:
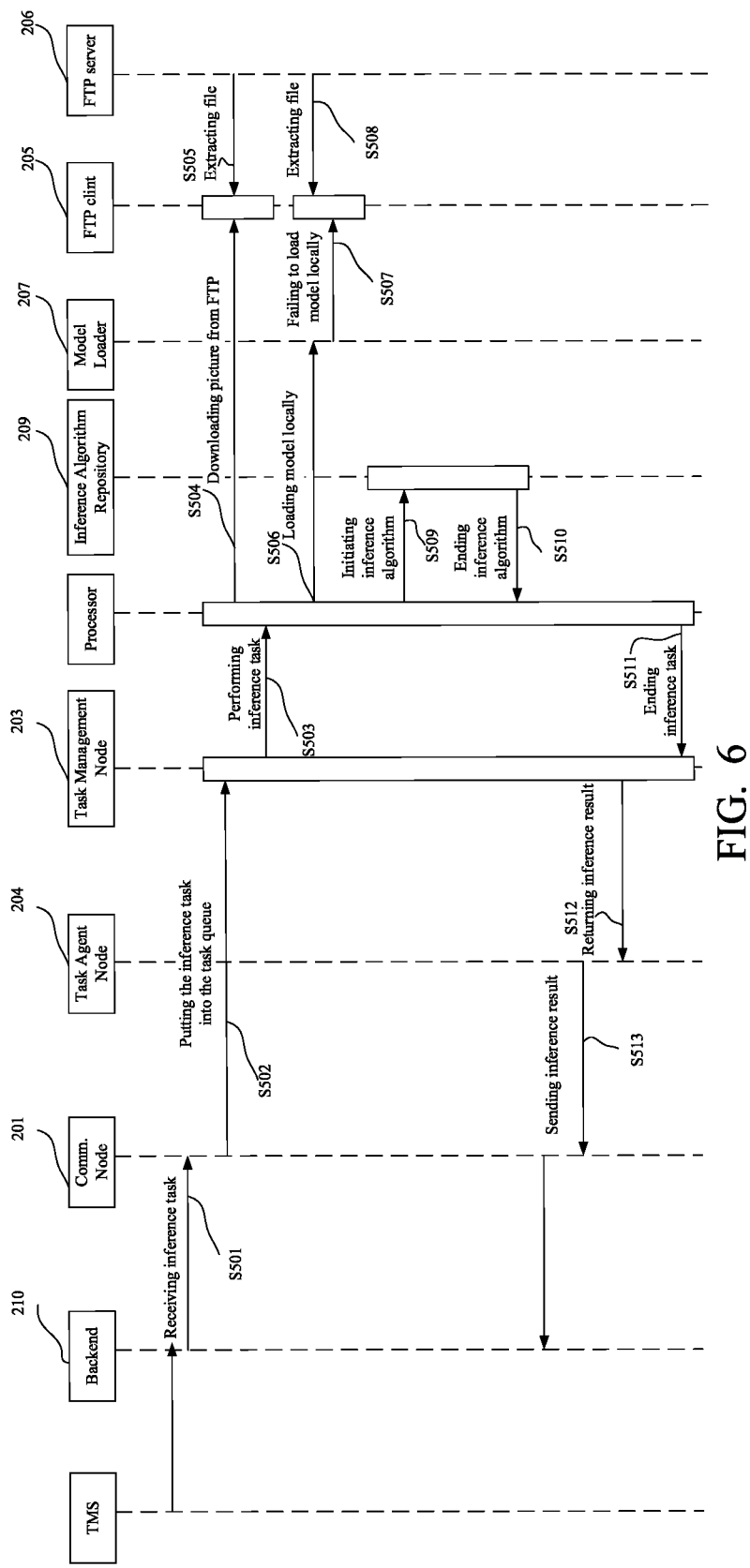
FIG. 6 schematically shows a schematic diagram of multi-stage interaction when an inference task is executed in an exemplary embodiment of the present disclosure.

In the exemplary embodiment, referring to FIG. 6, the target model may be used to perform real-time inference on the product to obtain the defect type of the product. The image information of the product may be obtained first, the image information may be stored in the XML file, and the image information may include information such as the site information, a product model, and an image storage address.

In the exemplary embodiment, the inference system sends the XML file address of the production line data set to the backend 210 in a form of the TCP message. The backend 210 may obtain the XML file according to the file address, and parse the information of the data set in the XML file, organize it into the inference task which includes information, such as a load address of the inference data set, a load address of the inference model, an md5 value of the inference model, and related configuration of the FTP server, and then send it to the communication node; then the steps S501 and S502 may be executed. The communication node 201 receives the inference task, and put the inference task into the task queue. When the task management node 203 is idle, the inference task may be obtained from the queue, and the step S503 may be executed to start the inference task.

In the exemplary embodiment, for the inference task, steps S504, S505, S506, S507, and S508 may be performed first. First, it is necessary to load the image information needed by the inference task from the remote FTP server (FTP SERVER) 206 according to the product information, and load the target model that matches the data set through a model loader 207. The model may be loaded from the locally cached model first. If the local loading fails, the target model is downloaded from the remote FTP server through the FTP protocol (FTP client) 205. After the image information and the target model are downloaded, a step S509 may be executed in which the processor calls the inference algorithm from an inference algorithm repository 209 to perform inference. After the inference on all images in the image information is completed, a step S510 is executed to exit the inference algorithm and end the inference task. Finally, steps S511, S512, and S513 may be executed, and an inference result message (a maincode class of each inferred image and a confidence of the maincode class, a subcode class and a confidence of the subcode class, a position of the defect frame, etc.) is packaged into the TCP message according to the specified format, and the inference task is over at this point; the task management node 203 may send the packaged message to the task agent node 204, and then the task agent node will feed back it to the communication node 201, and the communication node 201 may send it to the backend 210.

The above steps are described in detail below.

In the exemplary embodiment, different inference tasks may correspond to different product information, so each inference task may call a different target model. It may be very time-consuming to load the target model of the corresponding task after each task is received, which may cause the task processing timeout. Therefore, in order to save inference time, after the server is enabled, it may first complete the loading of the target model in advance, and the loaded target model is directly called every time the inference task is received.

In the exemplary embodiment, because there are too many product types and sites involved in the service, and each product may correspond to a different target model, if all models are loaded into a video memory, the video memory may overflow, and the inference task cannot be completed. Therefore, when the server is enabled for the first time, only the target models corresponding to the more commonly used products may be loaded into the video memory. Subsequently, when the target model corresponding to the product needs to be loaded later, it is loaded accordingly.

In the exemplary embodiment, each time the target model is loaded, the loading time is bound to each target model as a timestamp. And every time the target model is called, the timestamp may be changed to the calling time. In addition, a corresponding code list, a general threshold, and a special threshold in the configuration information set before training the initial model may also be bound to the target model. After configuration information is modified later, the inference task may be not affected.

In the step S510, the target model and image information of a product are acquired according to the product information.

In the exemplary embodiment, after receiving the inference task message, the server may first parse the inference task and obtain the image list (an absolute path of each image) of the inference task, and information of the called subcode model, the called maincode model, the called TDI model, or the like.

In the exemplary embodiment, according to the image information acquiring address in the inference task message, the image information of this inference task is downloaded to the server locally, and then the target model may be loaded. When the target model is loaded, it may be determined whether the target model specified in the inference task has been loaded. If there is a target model corresponding to the image information in a loaded target model list, the loaded target model may be called directly to complete the inference; if there is no target model corresponding to the image information in the loaded target model list, it is determined that whether the product name and site name in the specified model exist in a loaded product information list. If so, the model is a target model to be updated, and a new target model needs to be reloaded and the old model is released from the video memory; if not, the model is a model to be launched, and the new target model needs to be loaded first. The loading of the new target model may be completed online, and it will be added to the loaded target model list.

In the exemplary embodiment, in order to prevent a continuous loading of new models from causing the video memory overflow, when the number of models loaded into the video memory reaches a preset number, the target model that has not been called for a long time will be deleted according to the timestamp, and the video memory will be released. The preset number may be 30, 40, etc., and may also be set according to a configuration of the server used by the user, which is not specifically limited in the exemplary embodiment.

In the step S520, the image information is input to the target model to obtain a defect location and a defect type of the product.

In the exemplary embodiment, after the target model is loaded, the image information in the inference task will be sequentially read into the memory and sent to the prepared target model for inference. Based on the set threshold, each image will get its defect category, defect location and its confidence after passing the model. After the image information in this task has obtained the defect category, the defect location and its confidence, the inference algorithm is exited, and the inference task is completed.

In the exemplary embodiment, after the defect categories, the defect locations, and the confidences of all image information are obtained, the inference results of all images in the entire task are integrated, and the integrated inference results are returned to the inference system through the task agent node and the communication node.

In the exemplary embodiment, the server may be one or more devices that can use GPU computing resources to perform the inference task and the training task. The inference task performed based on artificial intelligence may be a defect recognition task based on the target model, and the target model is mainly a neural network model based on deep learning. For example, the target model may be based on a feedforward neural network. The feedforward network may be implemented as an acyclic graph in which nodes are arranged in layers. Generally, a feedforward network topology includes an input layer and an output layer, and the input layer and the output layer are separated by at least one hidden layer. The hidden layer transforms an input received by the input layer into a useful representation for generating an output in the output layer. Network nodes are fully connected to nodes in adjacent layers via edges, but there are no edges between nodes within each layer. The data received at the nodes of the input layer of the feedforward network is propagated (i.e., "feedforwarded") to nodes in the output layer via an activation function. The activation function calculates states of nodes of each of successive layers in the network based on coefficients ("weights"), and the coefficients are associated with each of the edges connecting these layers, respectively. The output of the target model can take various forms, which are not limited in the present disclosure. The target model may also include other neural network models, such as a convolutional neural network (CNN) model, a recurrent neural network (RNN) model, a generative adversarial network (GAN) model, but it is not limited to this, and other neural network models known to those skilled in the art can also be used.

The target model usually needs to be obtained through training. Using the training algorithm to train the initial model described above may include the following steps: selecting the network topology; using a set of training data representing problems modeled by the network; and adjusting the weights until the network model has the smallest error for all instances of the training data set. For example, during a supervised learning and training process for the neural network, in response to the output produced by the input representing the instance in the training data set, the network compares the output with a "correct" labeled output of the instance; an error signal of a difference between the output and the marked output is calculated; and when the error signal is propagated backwards through the layers of the network, the weights associated with the connections are adjusted to minimize the error. When the error of each output generated from the instance of the training data set is minimized, the initial model is considered as "the trained model" and defined as the target model, and may be used for an artificial intelligence inference task.

In the process of inference and training of the neural network model, a buffer of a large number of parameters, activation values, and gradient values is involved, and each value in the buffer is to be completely updated in each training iteration, which requires very high calculation and throughput capabilities. The GPU has strong parallelism and high video memory bandwidth, and is extremely efficient in processing calculations associated with training the deep neural network. Therefore, the use of a GPU cluster integrated by the multiple GPUs may effectively improve the training and inference speed of the neural network model.

In the embodiments of the present disclosure, based on the inference task, the implementation of identifying the product defect content in the product image through the target model is as follows. First, the product image is scaled to a fixed pixel size M×N (or may not be scaled), and then the image with the fixed pixel size M×N is sent to the target model (VGG/Resnet/MobileNet, etc.). A feature map of the entire image is obtained through the multi-layer convolutional layer, the activation layer, the pooling layer, and the feature map is input to a screening area network (ZF/SSD/RPN, etc.). After calculation, a proposal region is obtained; then, operations such as convolution and pooling are performed for the proposal region to obtain a proposal feature of the proposal region, and then the proposal feature is sent to the follow-up full connection and a softmax network for classification (that is, classify what defect of the proposal is). The defect category with the largest probability is obtained as the final classification result, and the category and probability are recorded. In addition, the coordinates and size of the proposal region represent the location and size of the defect. The method for identifying the product defect content based on the defect model may adopt a similar modification of the above method or other methods known to those skilled in the art, which is not limited by the present disclosure herein.

In an exemplary embodiment of the present disclosure, the backend and the server may be a set of distributed system architectures, which are systems formed by passing and communicating messages through network connections and coordinating their behaviors. The components interact with each other to achieve a common goal. The network may be an Internet of Things based on the Internet and/or telecommunication network, it may be a wired network or a wireless network, for example, it may be an electronic network that can realize a function of information exchange such as a local area network (LAN), a metropolitan area network (MAN), a wide area network (WAN), and a cellular data communication network. The distributed computing system may have software components, such as software objects or other types of individually addressable isolated entities, such as distributed objects, agents, actors, virtual components, and so on. Generally, each such component is individually addressable and has a unique identity in the distributed system (such as integers, GUIDs, strings, or opaque data structures, etc.). In a distributed system that allows geographic distribution, applications may be deployed in a cluster. There are various systems, components, and network configurations that support distributed computing environments. For example, the computing systems may be connected together through a wired or wireless system, through a local network or a widely distributed network. At present, many networks are coupled to the Internet, which provides infrastructure for widely distributed computing, and includes many different networks. Although any network infrastructure may be used for system-prone communication such as described in various examples.

The backend, TMS system (inference system) and server provide the sharing of computer resources and services through the communication exchange between computing devices and systems. These resources and services include information exchange for objects (such as files), cache storage devices, and disk storage devices. These resources and services also include the sharing of processing capabilities across multiple processing units for load balancing, resource expansion, and processing specialization.

Figure 7:
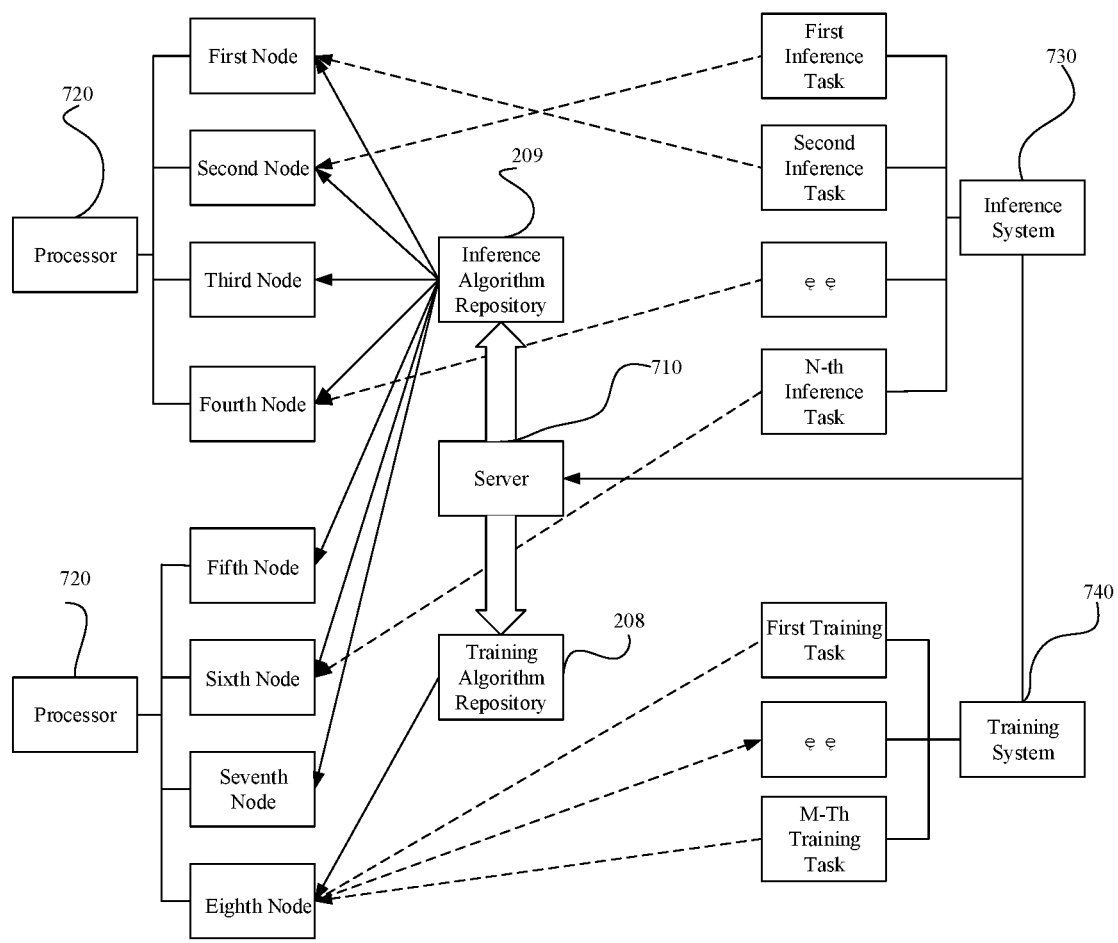
FIG. 7 schematically shows a schematic diagram of an architecture deployment of a server in an exemplary embodiment of the present disclosure.

In the exemplary embodiment, referring to FIG. 7, the server 710 receives multiple inference tasks sent by the inference system 730 and multiple training tasks sent by the training system 740, and assigns them to different nodes of different processors 720 for processing, and completes task scheduling, which may ensure the timely execution of multiple inference tasks and training tasks. For example, a first node, a second node, a third node, a fourth node, a fifth node, a sixth node and a seventh node in the processor 720 are all used for performing the inference task, and the first node, the second node, the third node, the fourth node, the fifth node, the sixth node and the seventh node can all access the inference algorithm repository 209. An eighth node is used for performing the training task, and the eighth node can interact with the training algorithm repository 208 to enable the eighth node to complete the related training task. In the exemplary embodiment, the first node, the second node, the third node, the fourth node, the fifth node, the sixth node, and the seventh node may all be GPU nodes for executing the training tasks and the inference task.

Figure 8:
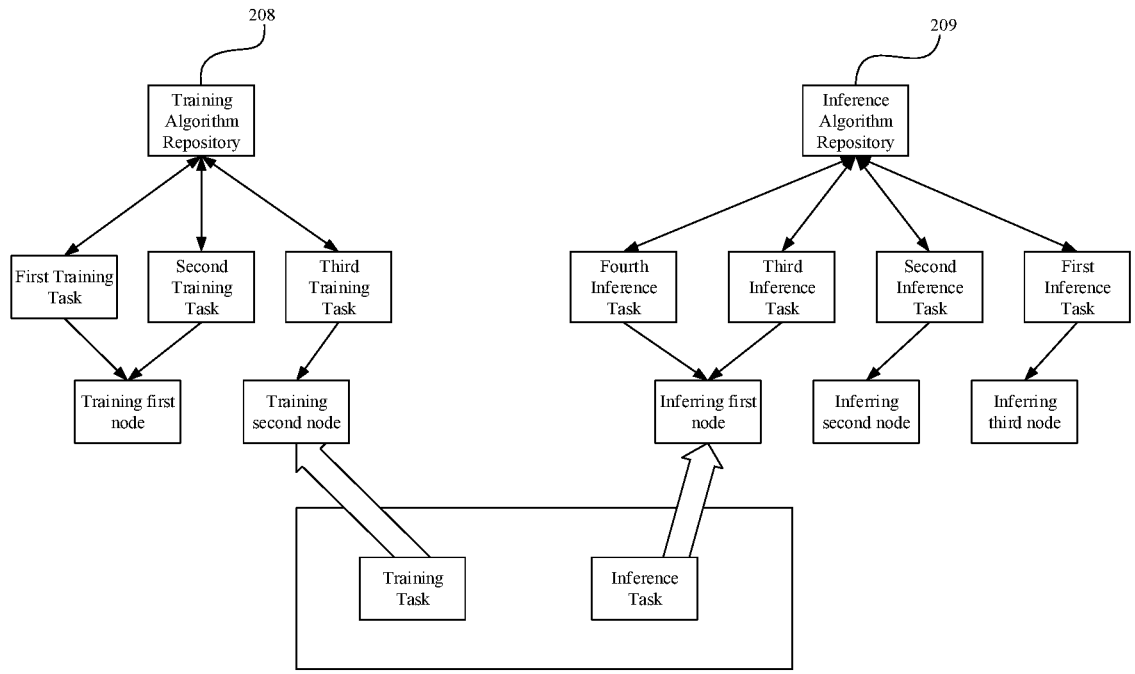
FIG. 8 schematically shows a schematic diagram of task scheduling of a server in an exemplary embodiment of the present disclosure.

In the exemplary embodiment, referring to FIG. 8, the server 710 may complete the scheduling of the training task and the inference task according to the type of node and the task volume of the node. The nodes of the inference task may call the inference algorithm from the inference algorithm repository 209, and the training task may call the training algorithm from the training algorithm repository 208.

Figure 9:
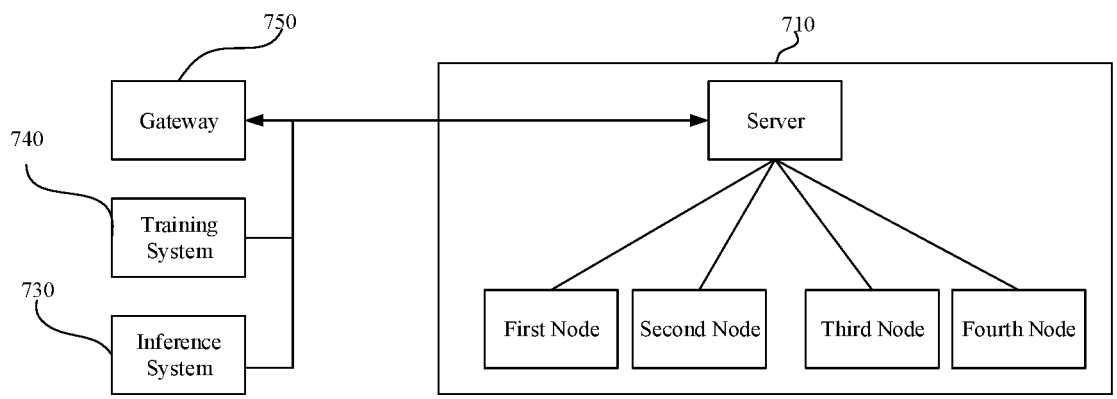
FIG. 9 schematically shows a schematic diagram of a system architecture for interaction between a server and a backend in an exemplary embodiment of the present disclosure.

In the exemplary embodiment, referring to FIG. 9, the inference system 730 and the training system 740 may communicate with the server 710 through the gateway 750, and send the inference task and the training task to the slave server 710, and the server 710 distributes and executes the task according to the status of each node in the processor 720.

Figure 10:
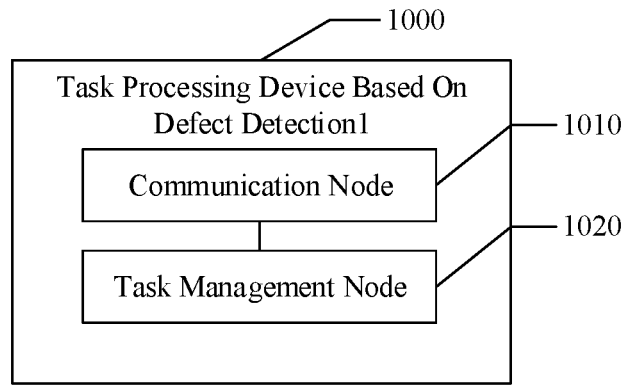
FIG. 10 schematically shows a schematic diagram of a composition of a task processing device based on defect detection in an exemplary embodiment of the present disclosure.

The following describes the device embodiments of the present disclosure, which may be configured to execute the task processing method based on defect detection of the present disclosure. In addition, in an exemplary embodiment of the present disclosure, there is also provided a task processing device based on defect detection. Referring to FIG. 10, the task processing device 1000 based on defect detection includes: a communication node 1010 and a task management node 1020.

The communication node 1010 may be configured to receive detection task, and identify a task type of the detection task; the task management node 1020 may be configured to store the detection task in a task queue if the task type is a target task type; and execute the detection task in a preset order and generate a feedback signal when a processor is idle.

Figure 11:
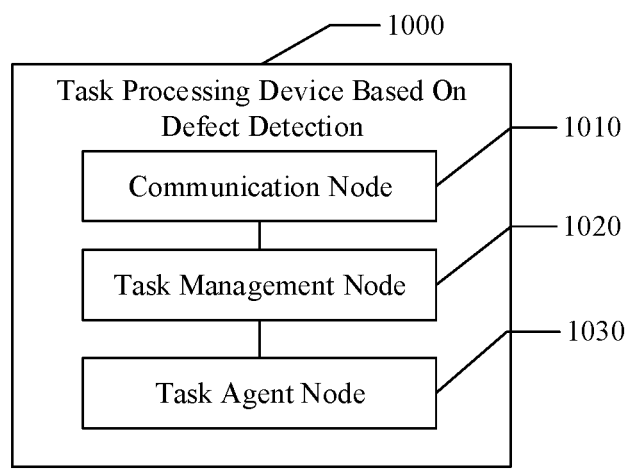
FIG. 11 schematically shows a schematic diagram of a composition of a task processing device based on defect detection in an exemplary embodiment of the present disclosure.

In the exemplary embodiment, referring to FIG. 11, the device may further include a task agent node 1030, and the task agent node 1030 may be configured to receive the feedback signal and send the feedback signal through the communication module.

Since the various functional modules of the task processing device based on defect detection in the exemplary embodiment of the present disclosure correspond to the steps of the above exemplary embodiments of the task processing method based on defect detection, for details that are not disclosed in the device embodiments of the present disclosure, please refer to the embodiment of the task processing method based on defect detection described above in the present disclosure.

It should be noticed that, although several modules or units of apparatus for action execution are mentioned in the detailed description above, such division is not mandatory. Indeed, according to embodiments of the present disclosure, the features, and functions of two or more modules or units described above may be embodied in one circuit or unit. Conversely, the features and functions of one of the modules or units described above may be further divided into a plurality of modules or units to embody.

In addition, in an exemplary embodiment of the present disclosure, there is also provided a task processing apparatus based on defect detection.

Those skilled in the art may understand that various aspects of the present invention may be implemented as a system, method, or program product. Therefore, various aspects of the present invention may be embodied in the following forms: a complete hardware implementation, a complete software implementation (including firmware, microcode, etc.), or a combination of hardware and software, which may be collectively referred to herein 'circuit', 'module', or 'system'.

A task processing apparatus 1200 based on defect detection according to an embodiment of the present invention is described below with reference to FIG. 12. The task processing apparatus 1200 based on defect detection shown in FIG. 12 is merely an example, and should not impose any limitation on the functions and scope of use of the embodiment of the present invention.

Figure 12:
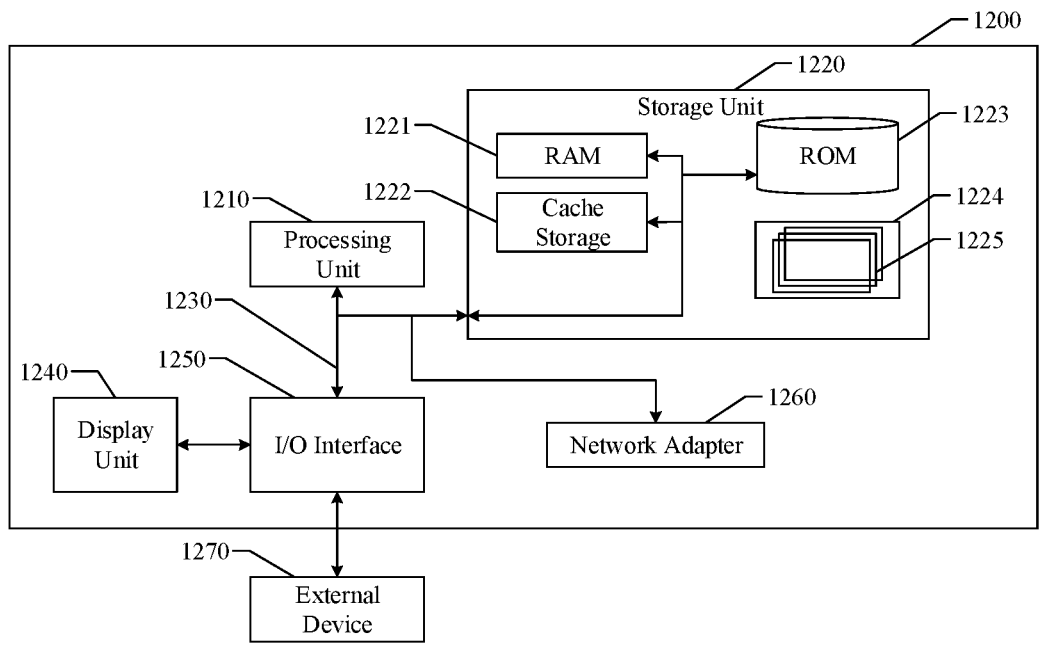
FIG. 12 schematically shows a structural diagram of a computer system suitable for implementing a task processing apparatus based on defect detection according to an exemplary embodiment of the present disclosure.

As shown in FIG. 12, the task processing apparatus 1200 based on defect detection is expressed in the form of a general-purpose computing device. The components of the task processing apparatus 1200 based on defect detection may comprise, but are not limited to, at least one processing unit 1210, at least one storage unit 1220, a bus 1230 connecting different system components (including the storage unit 1220 and the processing unit 1210) and a display unit 1240.

The storage unit stores program codes, and the program codes may be executed by the processing unit 1210, so that the processing unit 1210 executes various steps of the exemplary embodiments according to the present invention described in the above-mentioned 'exemplary method' in the specification. For example, the processing unit 1210 may perform the following steps: in S110, a detection task is received, and a task type of the detection task is determined; in S120, if the task type is a target task type, the detection task is stored in a task queue; and in S130, when a processor is idle, the detection task is executed in a preset order and a feedback signal is generated.

The storage unit 1220 may comprise a readable medium in the form of a volatile storage unit, such as a random access storage unit (RAM) 1221 and/or a cache storage unit 1222, and may further comprise a read-only storage unit (ROM) 1223.

The storage unit 1220 may further comprise a program/utility tool 1224 having a set of (at least one) program modules 1225. Such program modules 1225 comprise, but are not limited to, an operating system, one or more application programs, other program modules, and program data. Each or some combination of these examples may comprise an implementation of a network environment.

The bus 1230 may be one or more of several types representing bus structures, comprising a storage unit bus or a storage unit controller, a peripheral bus, a graphics acceleration port, a processing unit, or a local bus that uses any bus structure in a variety of bus structures.

The task processing apparatus 1200 based on defect detection may also communicate with one or more external devices 1270 (such as a keyboard, pointing device, Bluetooth device, etc.), may also communicate with one or more devices that enable a user to interact with the task processing apparatus 1200 based on defect detection, and/or with any device (e.g., router, modem, etc.) that enables the task processing apparatus 1200 based on defect detection to communicate with one or more other computing devices. This communication may be performed through an input/output (I/O) interface 1250. Moreover, the task processing apparatus 1200 based on defect detection may also communicate with one or more networks (such as a local area network (LAN), a wide area network (WAN), and/or a public network, such as the Internet) through the network adapter 1260. As shown, the network adapter 1260 communicates with other modules of the task processing apparatus 1200 based on defect detection through the bus 1230. It should be understood that although not shown in the figure, other hardware and/or software modules may be used in conjunction with the task processing apparatus 1200 based on defect detection, comprising but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementation manners, aspects of the present invention may also be implemented in the form of a program product, which comprises program code. When the program product runs on a terminal device, the program code is used to make the terminal device perform the steps according to various exemplary embodiments of the present invention described in the above-mentioned "exemplary method" section of this specification In the exemplary embodiment, the processor may include a first processor and a second processor. The first processor is configured to perform the inference task and the training task, and the first processor includes a plurality of nodes, which may be divided into inference task nodes and training task nodes. The inference task nodes are configured to perform the inference task, and training task nodes are configured to perform the training task. The second processor is configured to perform the detection tasks of the reference task type, which may specifically be the training status query task, the early termination of training task, the node information query tasks (querying the unique identification number and type of the current GPU node), the clear task for the task queue, and the task status query task, etc. The multiple tasks will not conflict with each other during the execution process, thereby ensuring timeliness of the task execution. Each first processor may include at least one graphics processor.

Figure 13:
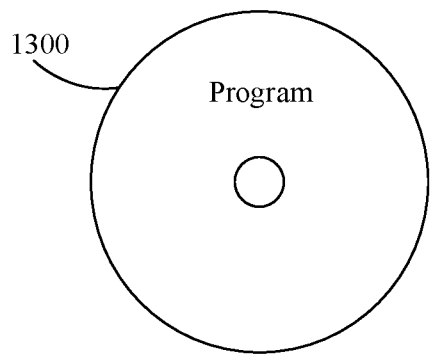
FIG. 13 schematically shows a schematic diagram of a computer-readable storage medium according to some embodiments of the present disclosure.

Referring to FIG. 13, a program product 1300 for implementing the above method according to an embodiment of the present disclosure is described. The program product 800 can use a portable compact disc read-only memory (CD-ROM) and include the program code, which may run on a terminal device, for example, personal computer. However, the program product of the present invention is not limited thereto. In this document, the readable storage medium may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media comprise: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may comprise a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, comprising but not limited to wireless, wired, optical cable, RF, etc., or any suitable combination of the foregoing.

The program code for performing the operations of the present invention may be written in any combination of one or more programming languages, which comprise object-oriented programming languages, such as Java, C++, etc. and further comprise conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of process comprised in the method of the exemplary embodiment of the present invention, and are not intended to limit the purpose. It is easy to understand that the processes shown in the above drawings does not indicate or limit the chronological order of these processes. In addition, it is also easy to understand that these processes may be performed synchronously or asynchronously in a plurality of modules, for example.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A defect detection task processing method, comprising:
receiving, by a server comprising at least one hardware processor, a detection task, and determining a task type of the detection task;
storing, by the server, the detection task in a task queue if the task type is a target task type; and
when a processor of the server is idle, executing, by the server, the detection task in a preset order and generating a feedback signal;
wherein the detection task of the target task type includes an inference task and a training task and executing the training task comprises:
modifying, by the server, configuration information according to a preset rule based on product information in the detection task, by: extracting, by the server, a product information field in the detection task to obtain the product information; and setting, by the server, a size of a training image, a number of training times, a number of test times, a defect threshold, and a learning rate decay strategy according to the preset rule based on the product information;
acquiring, by the server, training data comprising the training image and an initial model according to the product information;
modifying the size of the training image of the training data to a size corresponding to the size of the training image of the configuration information;
using, by the server, the modified training data to train the initial model according to the configuration information to obtain a target model; and
storing, by the server, the target model.

2. The method according to claim 1, wherein:
the task type comprises the target task type and a reference task type; and
if the task type is the reference task type, the detection task is directly executed by the processor.

3. The method according to claim 1, wherein executing the detection task in the preset order comprises executing the detection task according to an order of storage in the task queue.

4. The method according to claim 1, wherein the training task comprises a training data acquiring address and model data information; the acquiring the training data and the initial model according to the product information comprises:
downloading the training data according to the training data acquiring address;
acquiring the model data information according to a model data information field; and
acquiring the initial model according to the model data information.

5. The method according to claim 1, wherein:
the training data comprises a label file and an image file, and
before the using the training data to train the initial model according to the configuration information to obtain the target model, the method further comprises:
pre-processing the training data, wherein the pre-processing the training data comprises:
deleting an abnormal image in the image file;

deleting an image file on which a label file matching operation is not needed;

matching the image file with the label file; and dividing the training data into a training set, a validation set, and a test set according to a preset ratio.

6. The method according to claim 5, wherein the using the training data to train the initial model according to the configuration information to obtain the target model comprises:

training the initial model according to the training set, the validation set, and the number of training times; and using the test set and the number of test times to complete a test on the trained initial model to obtain the target model.

7. The method according to claim 1, wherein the detection task comprises a task type label, and the determining the task type of the detection task comprises: identifying the task type label in the detection task to determine the task type of the detection task.

8. The method according to claim 1, wherein executing the training task further comprises:

uploading the target model and a training result to a preset address; and wherein the training result comprises an accuracy rate, a recall rate and an F1 score of the target model.

9. The method according to claim 1, wherein executing the inference task comprises:

acquiring the target model and image information of a product according to the product information; and inputting the image information to the target model to obtain a defect location and a defect type of the product.

10. The method according to claim 8, wherein the inference task comprises an image information acquiring address, and acquiring the image information of the product according to the product information comprises: downloading the image information according to the image information acquiring address.

11. The method according to claim 8, wherein acquiring the target model according to the product information comprises:

detecting whether there is a target model corresponding to the product information in a local repository;

if there is the target model corresponding to the product information in the local repository, loading the target model in the local repository; and if there is no target model corresponding to the product information in the local repository, downloading the target model corresponding to the product information according to the product information by the local repository.

12. The method according to claim 11, wherein the local repository comprises a preset number of target models, and when a number of target models in the local repository is greater than the preset number, the local repository is updated according to a time sequence in which the target model is used, so that the number of target models in the local repository remains at the preset number.

13. The method according to claim 11, wherein executing the inference task further comprises generating the feedback signal according to the defect location and the defect type of the product.

14. A defect detection task processing device, comprising:

at least one hardware processor;

a communication service configured to receive detection task, and identify a task type of the detection task; and a task management service configured to store the detection task in a task queue if the task type is a target task type, execute the detection task in a preset order, and generate a feedback signal when the at least one hardware processor is idle, wherein the detection task of the target task type includes an inference task and a training task, and the task management service is further configured to:

modify configuration information according to a preset rule based on product information in the detection task, by: extracting a product information field in the detection task to obtain the product information; and setting a size of a training image, a number of training times, a number of test times, a defect threshold, and a learning rate decay strategy according to the preset rule based on the product information;

acquire training data comprising the training image and an initial model according to the product information;

modify the size of the training image of the training data to a size corresponding to the size of the training image of the configuration information;

use the modified training data to train the initial model according to the configuration information to obtain a target model; and store the target model.

15. The device according to claim 14, wherein the task processing device further comprises a task agent service configured to receive the feedback signal and send the feedback signal through the communication service.

16. A defect detection task processing apparatus, comprising:

at least one hardware processor; and a memory having program instructions stored thereon which, when executed by the at least one hardware processor, directs the at least one hardware processor to implement the task processing method based on defect detection according to claim 1.

17. The defect detection task processing apparatus according to claim 16, wherein:

the task type comprises the target task type and a reference task type;

the at least one hardware processor comprises:

a first processor comprising at least one graphics processor configured to execute the inference task and the training task; and a second processor configured to execute a detection task of the reference task type.

18. A non-transitory computer-readable storage medium on which a computer program is stored, wherein the program, when executed by a processor, implements the defect detection task processing method according to claim 1.

* * * * *